(12) United States Patent
Fan

(10) Patent No.: US 10,372,284 B2
(45) Date of Patent: Aug. 6, 2019

(54) CAPACITANCE VARIATION DETECTION CIRCUIT, TOUCH SCREEN AND TOUCH DETECTION METHOD

(71) Applicant: SHENZHEN GOODIX TECHNOLOGY CO., LTD., Shenzhen, Guangdong (CN)

(72) Inventor: Shuo Fan, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 49 days.

(21) Appl. No.: 15/879,760

(22) Filed: Jan. 25, 2018

(65) Prior Publication Data

US 2018/0150157 A1 May 31, 2018

Related U.S. Application Data

(63) Continuation of application No. PCT/CN2016/103379, filed on Oct. 26, 2016.

(51) Int. Cl.
*G06F 3/044* (2006.01)
*G06F 3/041* (2006.01)
*G06K 9/00* (2006.01)

(52) U.S. Cl.
CPC .......... *G06F 3/044* (2013.01); *G06F 3/0412* (2013.01); *G06F 3/0418* (2013.01); *G06K 9/0002* (2013.01); *G06K 9/00087* (2013.01)

(58) Field of Classification Search
CPC ...... G06F 3/044; G06F 3/0418; G06F 3/0412; G06K 9/00087; G06K 9/0002
See application file for complete search history.

(56) References Cited

U.S. PATENT DOCUMENTS 8,729,877 B2    5/2014  Ivanov et al.
2008/0111714 A1* 5/2008 Kremin .................. G06F 3/044
                                                    341/33

(Continued)

FOREIGN PATENT DOCUMENTS

CN          104679372 A      6/2015

OTHER PUBLICATIONS

State Intellectual Property Office of the P.R. China (ISR/CN), "International Search Report for PCT/CN2016/103379", China, dated Aug. 2, 2017.

*Primary Examiner* — Brent D Castiaux
(74) *Attorney, Agent, or Firm* — Heslin Rothenberg Farley & Mesiti P.C.

(57) ABSTRACT

The present disclosure relates to a capacitance variation detection circuit, a touch screen and a touch detection method. The method includes: connecting one terminal of a detection capacitor and one terminal of a denoising capacitor to a first power simultaneously, and connecting the other terminal of the detection capacitor and the other terminal of a denoising capacitor to a reference ground simultaneously; disconnecting the detection capacitor from the first power source and connecting it to the negative input terminal of the operation amplifier, switching the one terminal of the denosing capacitor from being connected to the first power source to being connected to the reference ground, and connecting the other terminal of the denoising capacitor to the negative input terminal of the operational amplifier; and acquiring an output result of the operational amplifier, and judging whether there is a touch operation according to the output result.

20 Claims, 3 Drawing Sheets

(56) References Cited

U.S. PATENT DOCUMENTS

| | | | |
|---|---|---|---|
| 2009/0243631 A1* | 10/2009 | Kuang | G01R 27/2605 324/658 |
| 2010/0085322 A1* | 4/2010 | Mamba | G06F 3/044 345/173 |
| 2015/0109243 A1* | 4/2015 | Jun | G06F 3/044 345/174 |

* cited by examiner

US 10,372,284 B2

CAPACITANCE VARIATION DETECTION CIRCUIT, TOUCH SCREEN AND TOUCH DETECTION METHOD

CROSS-REFERENCE TO RELATED APPLICATIONS

The present application is a continuation of international application No. PCT/CN2016/103379, filed on Oct. 26, 2016, which is incorporated herein by reference in its entirety.

TECHNICAL FIELD

Embodiments of the present disclosure relate to the technical field of touch detection, and in particular, relate to a capacitance variation detection circuit, a touch screen and a touch detection method.

BACKGROUND

In application of touch detection on a touch screen or fingerprint identification, generally a touch operation or a fingerprint is detected by detecting capacitance variation. In a capacitance variation detection circuit, a circuit structure in the prior art is as illustrated in FIG. 1 and FIG. 2. In the state as illustrated in FIG. 1, switches S1, S3 and S5 are turned on and a detection capacitor Ctp is charged, charges stored in capacitors C1 and C2 are released, and other switches are all turned off. In the state as illustrated in FIG. 2, switches S2 and S4 are turned on, the other switches are turned off, charges stored in the detection capacitor Ctp are re-allocated, and according to the law of conservation of charge, the following equation is obtained:

$$Q = C_{tp}V_{pwr} = C_{tp}V_{ref} + C_1 V_{ref} + C_2(V_{ref} - V_{out})$$

An output after N times of sampling is:

$$V_{out} = V_{ref} - N \frac{C_{tp}(V_{pwr} - V_{ref}) - C_1 V_{ref}}{C_2}$$

When the capacitance of the detection capacitor Ctp varies due to a touch press, a fingerprint or the like, the variation of the detection capacitor Ctp may be detected according to the output of the circuit. Ctp includes a basic value before variation, and a variation, which are respectively Cbg and Csig. After N times of sampling, the following equation is obtained:

$$V_{out} = V_{ref} - N \frac{C_{bg}(V_{pwr} - V_{ref}) - C_1 V_{ref}}{C_2} - N \frac{C_{sig}(V_{pwr} - V_{ref})}{C_2}$$

It is apparent that since C1 is added, a useless charge variation caused by capacitance basic value Cbg is offset, and the variation portion may be only analyzed with respect to an output result.

However, during practice of the present disclosure, the inventors have identified that the above process has a problem:

Since Vpwr includes noise which comes from a driving circuit generating Vpwr, and other interference which is originated from a mobile or wearable device, including but not limited to interference from a screen driving signal or interference from a charger or interference from other parts of the chip. Therefore, after N times of sampling and integration, the noise and interference may also be increased with the integration. As a result, the output signal has an excessively low signal-to-noise ratio, which reduces the accuracy of touch detection or fingerprint identification.

SUMMARY

In view of the above, embodiments of the present disclosure provide a capacitance variation detection circuit, a touch screen and a touch detection method, to solve the problem the accuracy of touch detection or fingerprint identification is lowered due to noise and interference. By reducing or eliminating impacts caused by noise of a driving voltage and other interference signals superimposed on the driving voltage onto an output of an integrating circuit, a signal-to-noise ratio of useful signals is improved, design requirements imposed by the circuit onto other modules are lowered, and overall power consumption of a chip is reduced.

In a first aspect, embodiments of the present disclosure provide a capacitance variation detection circuit, configured to detect a capacitance variation of a detection capacitor, one terminal of the detection capacitor being connected to a reference ground and the other terminal of the detection capacitor being connected to a first power source. The detection circuit includes:

an operational amplifier, a denoising capacitor, an integrating capacitor and a plurality of switches;

where a positive input terminal of the operational amplifier is connected to a second power source, and a negative input terminal of the operational amplifier is connected to the other terminal of the detection capacitor via a first switch;

where one terminal of the denoising capacitor is connected to the other terminal of the detection capacitor via a second switch and is connected to the reference ground via a third switch, and the other terminal of the denoising capacitor is connected to the first power source via a fourth switch and is connected to the reference ground via a fifth switch; and where two terminals of the integrating capacitor are connected via a sixth switch.

Further, the first power source is a driving voltage source and a driving current source.

Further, the denoising capacitor is a capacitance-adjustable capacitor.

Further, a first resistor is connected between the second switch and the negative input terminal of the operation amplifier.

Further, a second resistor is connected between the second power source and the positive input terminal of the operation amplifier.

In a second aspect, embodiments of the present disclosure provide a touch screen. The touch screen includes the above capacitance variation detection circuit.

In a third aspect, embodiments of the present disclosure provide a touch detection method. The method includes:

at a first stage, connecting one terminal of a detection capacitor and one terminal of a denoising capacitor to a first power simultaneously, and connecting the other terminal of the detection capacitor and the other terminal of a denoising capacitor to a reference ground simultaneously;

at a second stage, disconnecting the detection capacitor from the first power source, connecting the detection capacitor to the negative input terminal of the operation amplifier, switching the one terminal of the denosing capacitor from being connected to the first power source at the first stage to being connected to the reference ground, and connecting the other terminal of the denoising capacitor to the negative input terminal of the operational amplifier; and acquiring an output result of the operational amplifier, and judging whether there is a touch operation according to the output result.

Further, the acquiring an output result of the operational amplifier includes: repeatedly performing the first stage and the second stage according to a predetermined execution count to obtain the output result.

Further, the predetermined execution count varies with different detection capacitors.

Further, before the first stage, a switch between two electrode plates of the integrating capacitor is turned on to discharge the integrating capacitor, and upon completion of discharge, the switch between the two electrode plates of the integrating capacitor is turned off again.

Further, a capacitance of the denoising capacitor is adjusted according to a capacitance of the detection capacitor.

With the capacitance variation detection circuit, the touch screen and the touch detection method according to the embodiments of the present disclosure, a denoising capacitor samples noise and interference caused to a detection capacitor, and impacts caused by the noise and interference are eliminated by means of charge re-allocation. Specifically, while the detection capacitor is being charged, the denoising capacitor is connected to the same power source, and therefore, the noise and interference loaded onto the detection capacitor and the denoising capacitor have the same phase. In this way, during the charge re-allocation and integration process, the noise and interference superimposed on the denoising capacitor may offset the noise and interference superimposed on the detection capacitor. When noise and interference of a driving voltage cause no adverse impact onto the signal-to-noise ratio of the circuit, a signal-to-noise ratio of a final output signal is improved. Correspondingly, the design requirements on other modules may be lowered, the detection difficulty of software and the difficulty of the detection algorithm can be lowered, and thus the complexity and overall power consumption of the chip can be reduced.

BRIEF DESCRIPTION OF THE DRAWINGS

To describe the technical solutions of the present disclosure or the prior art more clearly, hereinafter, drawings that are to be referred for description of the embodiments or the prior art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

To make a person skilled in the art better understand the technical solutions of present disclosure, the technical solutions according to the embodiments of the present disclosure are clearly and completely described with reference to the accompanying drawings of the embodiments of the present disclosure. Obviously, the embodiments described herein are merely exemplary ones, but are not all the embodiments. Preferred embodiments are illustrated in the accompanying drawings. The present disclosure may be practiced in various ways, and the practice is not limited to the embodiments described hereinafter. On the contrary, these embodiments are provided to make the disclosure of the present disclosure more thoroughly and completely understood. Based on the embodiments of the present disclosure, all other embodiments derived by persons of ordinary skill in the art without any creative efforts shall fall within the protection scope of the present disclosure.

Unless otherwise defined, all the technical and scientific terms used in this specification are the same as those usually understood by persons skilled in the art of the present disclosure. The terms in the specification of the present disclosure are only used to describe the specific embodiments, but not to limit the present disclosure. The terms "comprise", "include" and variations thereof in the specification, claims and accompanying drawings are intended to define a non-exclusive meaning.

Term "embodiments" in this specification signifies that the specific characteristic, structure or feature described with reference to the embodiments may be covered in at least one embodiment of the present disclosure. This term, when appears in various positions of the description, neither indicates the same embodiment, nor indicates an independent or optional embodiment that is exclusive of the other embodiments. A person skilled in the art would implicitly or explicitly understand that the embodiments described in this specification may be incorporated with other embodiments.

Figure 1:
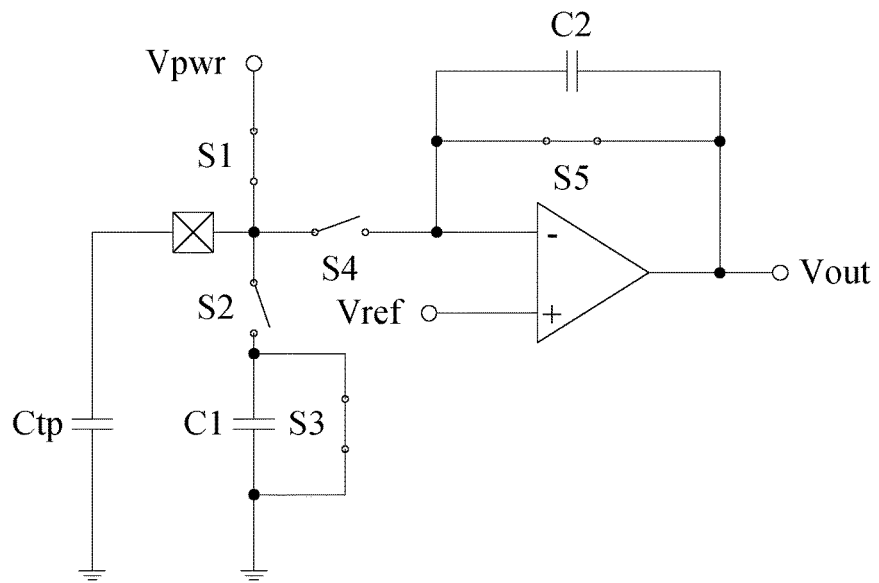
FIG. 1 is a schematic state diagram of a conventional capacitance variation detection circuit.
Figure 2:
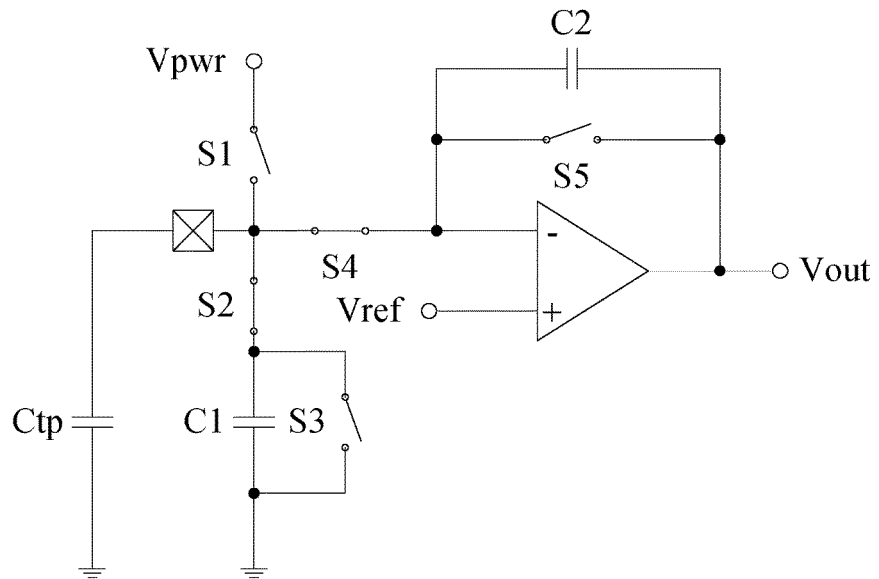
FIG. 2 is another schematic state diagram of a conventional capacitance variation detection circuit.
Figure 3:
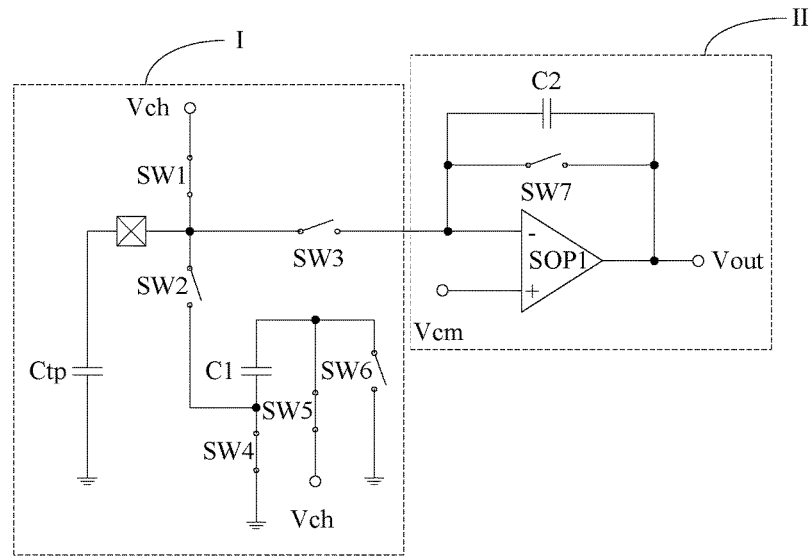
FIG. 3 is a schematic state diagram of a capacitance variation detection circuit according to an embodiment of the present disclosure.

In an embodiment of the present disclosure, FIG. 3 illustrates a state diagram of a capacitance variation detection circuit according to this embodiment.

Figure 4:
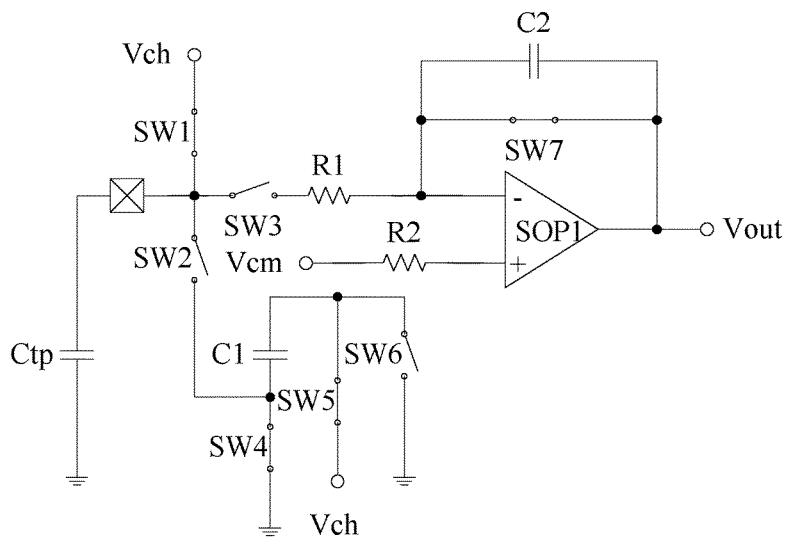
FIG. 4 is a schematic diagram of another capacitance variation detection circuit according to an embodiment of the present disclosure.

The circuit includes a sampling module I and an integrating module II. Specifically, as illustrated by two dotted line blocks in FIG. 3, the sampling module I includes a detection capacitor Ctp, a denoising capacitor C1 and a plurality of switches, i.e., switches SW1 to SW6 as illustrated in FIG. 3; the integrating module II includes an operational amplifier SOP1, an integrating capacitor C2 and a switch SW7; and devices and modules inside the sampling module I and the integrating module II may be connected in the following manners:

One terminal of the detection capacitor Ctp is connected to a reference ground, and the other terminal of the detection capacitor Ctp is connected to a power source Vch via the switch SW1 and is connected to one terminal of the denoising capacitor C1 via a switch SW2 and connected to a negative input terminal of the operational amplifier SOP1 via a switch SW3. One terminal of the denoising capacitor C1 is connected to the reference ground via a switch SW4. Optionally, as illustrated in FIG. 4, a resistor R1 is connected between the switch SW3 and the negative input terminal of the operational amplifier SOP1.

The other terminal of the denoising capacitor C1 is connected to a power source Vch via a switch SW5, and is connected to the reference ground via a switch SW6. Optionally, the denoising capacitor C1 is a capacitance-adjustable capacitor. Specifically, the denoising capacitor C1 is adjusted to a suitable capacitance according to the capacitance of the detection capacitor Ctp.

Two terminals of the integrating capacitor C2 are connected via a switch SW7.

A positive input terminal of the operational amplifier SOP1 is connected to a power source Vcm. Optionally, as illustrated in FIG. 4, a resistor R2 is connected between the power source Vcm and the positive input terminal of the operational amplifier SOP1.

Optionally, the power source Vch is a driving voltage source or a driving current source, and the capacitance variation detection circuit is driven by using the driving voltage source or the driving current source.

Figure 5:
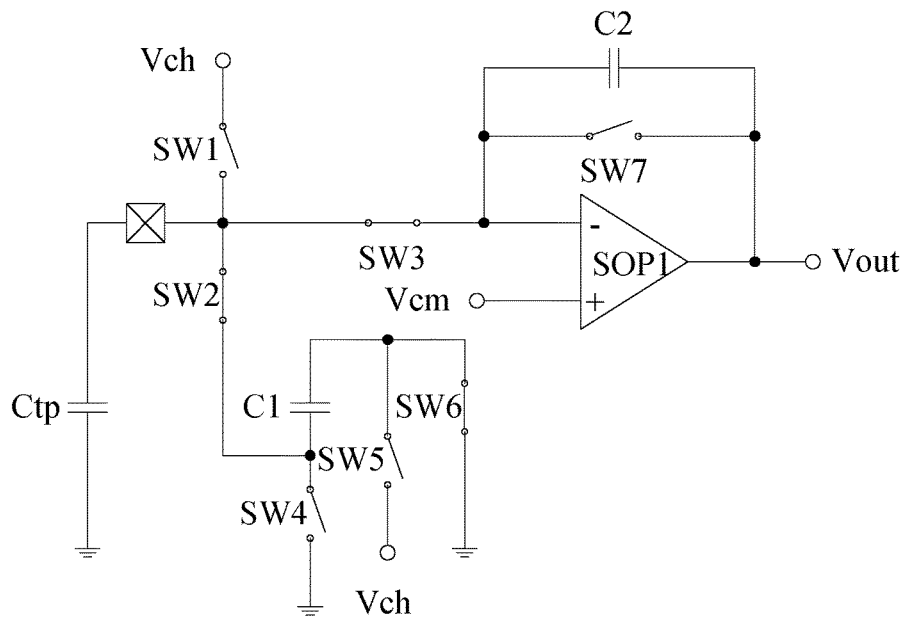
FIG. 5 is another schematic state diagram of a capacitance variation detection circuit according to an embodiment of the present disclosure.

The capacitance variation detection circuit according to this embodiment of the present disclosure supports two operating states:

at a sampling stage, such as a circuit operating state illustrated in FIG. 3; where in this operating state, the switches SW1, SW4 and SW5 are turned on, whereas the switches SW2, SW3 and SW6 are turned off; and at an integrating stage, such as a circuit operating state illustrated in FIG. 5; where in this operating state, the switches SW1, SW4 and SW5 are turned off, whereas the switches SW2, SW3 and SW6 are turned on.

With the capacitance variation detection circuit according to this embodiment of the present disclosure, a capacitance variation caused by a touch operation or fingerprint identification may be quickly detected.

In this embodiment, a touch screen is further provided. The touch screen includes the capacitance variation detection circuit as described in the above embodiment. The specific composition of the capacitance variation detection circuit may be referenced to the relevant content disclosed in the above embodiment, which is not described herein any further.

Figure 6:
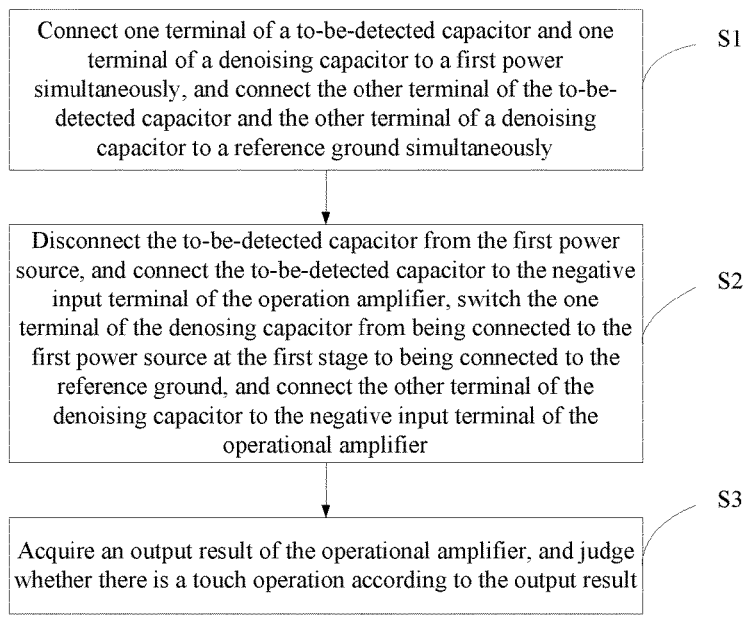
FIG. 6 is a flowchart of a touch detection method according to an embodiment of the present disclosure.

In an embodiment, as illustrated in FIG. 6, a touch detection method is provided. The method is based on the capacitance variation detection circuit as described in the above embodiment. The method includes:

S1: At a first stage, one terminal of a detection capacitor and one terminal of a denoising capacitor are connected to a first power simultaneously, and the other terminal of the detection capacitor and the other terminal of a denoising capacitor are connected to a reference ground simultaneously.

Specifically, referring to the circuit operating state diagram illustrated in FIG. 3, the switch SW1 between the detection capacitor Ctp and the power source Vch is turned on, one terminal of the denoising capacitor C1 is connected to the power source Vch, and the other terminal of the denoising capacitor C1 is connected to the reference ground, that is, the switches SW1, SW4 and SW5 are turned on, whereas the switches SW2, SW3 and SW6 are turned off.

It may be observed that the power source Vch charges the detection capacitor Ctp, and also charges the denoising capacitor C1 configured to offsetting noise. Since the detection capacitor Ctp and the denoising capacitor C1 are simultaneously charged by the power source Vch, the noise loaded by the power source Vch onto the detection capacitor Ctp and the denoising capacitor C1 has the same phase and amplitude as other interference signals.

S2: At a second stage, the detection capacitor is disconnected from the first power source, and the detection capacitor is connected to the negative input terminal of the operation amplifier, the one terminal of the denosing capacitor is switched from being connected to the first power source at the first stage to being connected to the reference ground, and the other terminal of the denoising capacitor is connected to the negative input terminal of the operational amplifier.

Specifically, referring to the circuit operating state diagram illustrated in FIG. 5, the switch between the detection capacitor Ctp and the power source Vch is turned off, the negative input terminal of the operational amplifier SOP1 is connected, the one terminal of the denosing capacitor is switched from being connected to the first power source at the first stage to being connected to the reference ground, and the other terminal of the denoising capacitor C1 is connected to the negative input terminal of the operational amplifier SOP1. That is, the switches SW1, SW4 and SW5 are turned off, whereas the switches SW2, SW3 and SW6 are turned on.

It may be known that at the second stage, the denoising capacitor C1 is equivalent to being inverted and then connected to the circuit, and the charges on the detection capacitor Ctp and the denoising capacitor C1 are re-allocated, such that an output Vout at an output terminal of the operational amplifier SOP1 may be calculated according to the law of charge conservation:

$$V_{out} = \frac{(V_{ch} - V_{cm})(C_{tp} - C_1)}{C_2} + V_{cm} \quad (1)$$

$V_{ch,N}$ is used to represent the noise or interference loaded onto the power source Vch, and with respect to $V_{ch,N}$, similarly based on the law of charge conservation, an output throughout integration is:

$$V_{out,N} = \frac{V_{ch,N}(C_{tp} - C_1)}{C_2} \quad (2)$$

It may be observed that since the detection capacitor Ctp and the denoising capacitor C1 are both charged by the power source Vch, if the value of Ctp-C1 in equation (2) is sufficiently small, the noise or interference output corresponding to $V_{ch,N}$ is weakened or eliminated.

S3: An output result of the operational amplifier is acquired, and whether there is a touch operation is judged according to the output result.

Specifically, the output Vout before variation is compared with the output Vout after variation to calculate a variation value of the capacitor Ctp, such that whether there is a touch operation or fingerprint identification operation may be judged.

Optionally, before judging whether there is a touch operation according to the output result of the operational amplifier SOP1, the acquiring an output result of the operational amplifier SOP1 specifically includes: repeatedly performing the operations at the first stage and the second stage according to a predetermined execution count N to obtain the output result, where the execution count N is a positive integer. The operations may be performed several times or hundreds of times according to the specific circuit. Optionally, the predetermined execution count varies with different detection capacitors. Through sampling integration for multiple times, the value of the output result Vout may be amplified, for the convenience of detection judgment. In the above embodiment, the switch SW7 may retain a turned-off state. That is, the switch is not arranged in the circuit.

In another embodiment, optionally, when the operation at the first stage is performed, the switch SW7 between two electrode plates of the integrating capacitor C2 is turned off to discharge the remaining charges in the integrating capacitor C2. After the integrating capacitor C2 is discharged, the switch SW7 between the two electrode plates of the integrating capacitor C2 is turned off again to start a new integration cycle. In this way, the integration cycle may not be affected due to the remaining charges in the integrating capacitor C2.

Optionally, the capacitance of the denoising capacitor C1 may be adjustable. The method further includes adjusting the capacitance of the denoising capacitor C1 according to the capacitance of the detection capacitor Ctp. A signal-to-noise ratio satisfying the detection need may be obtained by adjusting the capacitance of the denoising capacitor C1.

With the capacitance variation detection circuit, the touch screen and the touch detection method according to the embodiments of the present disclosure, a denoising capacitor samples noise and interference caused to a detection capacitor, and impacts caused by the noise and interference are eliminated by means of charge re-allocation. Specifically, while the detection capacitor is being charged, the denoising capacitor is connected to the same power source, and therefore, the noise and interference loaded onto the detection capacitor and the denoising capacitor have the same phase. In this way, during the charge re-allocation and integration process, the noise and interference superimposed on the denoising capacitor may offset the noise and interference superimposed on the detection capacitor. When noise and interference of a driving voltage cause no adverse impact onto the signal-to-noise ratio of the circuit, a signal-to-noise ratio of a final output signal is improved. Correspondingly, the design requirements on other modules may be lowered, the detection difficulty of software and the difficulty of the detection algorithm are lowered, and thus the complexity and overall power consumption of the chip are reduced.

Described above are exemplary embodiments of the present disclosure, which are not intended to limit the protection scope of the present disclosure. Although the present disclosure is described in detail with reference to the above embodiments, a person skilled in the art would still make modifications to the specific embodiments and the technical solutions disclosed therein, or would still make equivalent replacements to a part of the technical features therein. Any equivalent structure made based on the specification and accompanying drawings of the present disclosure, even if being directly or indirectly applied to some other related technical fields, shall all fall within the protection scope of the present disclosure.

What is claimed is:

1. A capacitance variation detection circuit, configured to detect a capacitance variation of a detection capacitor, comprising:
a denoising capacitor, wherein one terminal of the denoising capacitor is connected to a first terminal of the detection capacitor via a second switch and to a reference ground via a third switch, the first terminal of the detection capacitor is connected to a first power source, a second terminal of the detection capacitor is connected to the reference ground, and the other terminal of the denoising capacitor is connected to the first power source via a fourth switch and to the reference ground via a fifth switch;
an operational amplifier, wherein a positive input terminal of the operational amplifier is connected to a second power source, and a negative input terminal of the operational amplifier is connected to the first terminal of the detection capacitor via a first switch; and
an integrating capacitor, wherein two terminals of the integrating capacitor are connected via a sixth switch, and are connected between the negative input terminal of the operational amplifier and an output terminal of the operational amplifier.

2. The capacitance variation detection circuit according to claim 1, wherein the first power source is a driving voltage source or a driving current source.

3. The capacitance variation detection circuit according to claim 1, wherein the denoising capacitor is a capacitance-adjustable capacitor.

4. The capacitance variation detection circuit according to claim 1, wherein a first resistor is connected between the second switch and the negative input terminal of the operation amplifier.

5. The capacitance variation detection circuit according to claim 4, wherein the first resistor is connected between the first switch and the negative input terminal of the operation amplifier.

6. The capacitance variation detection circuit according to claim 4, wherein a second resistor is connected between the second power source and the positive input terminal of the operation amplifier.

7. The capacitance variation detection circuit according to claim 1, further comprising a seventh switch, wherein the seventh switch is connected between the first power source and the detection capacitor.

8. The capacitance variation detection circuit according to claim 7, wherein at a sampling stage of the capacitance variation detection circuit: the third switch, the fourth switch and the seventh switch are turned on; the first switch, the second switch, the fifth switch are turned off; and the sixth switch is turned on or turned off; and at an integrating stage of the capacitance variation detection circuit: the third switch, the fourth switch, the sixth switch and the seventh switch are turned off; and the first switch, the second switch, the fifth switch are turned on.

9. The capacitance variation detection circuit according to claim 1, wherein the detection capacitor and the denoising capacitor are connected to the first power simultaneously at a first stage; and the detection capacitor is connected to the negative input terminal of the operation amplifier at a second stage, while the one terminal of the denosing capacitor is connected to the reference ground and the other terminal of the denosing capacitor is connected to the negative input terminal of the operation amplifier.

10. A touch screen, comprising:
a detection capacitor, wherein a first terminal of the detection capacitor is connected to a first power source via a seventh switch, a second terminal of the detection capacitor is connected to the reference ground; and
a capacitance variation detection circuit, configured to detect a capacitance variation of the detection capacitor, wherein the capacitance variation detection circuit comprises:
a denoising capacitor, wherein one terminal of the denoising capacitor is connected to the first terminal of the detection capacitor via a second switch and to a reference ground via a third switch, and the other terminal of the denoising capacitor is connected to the first power source via a fourth switch and to the reference ground via a fifth switch;

an operational amplifier, wherein a positive input terminal of the operational amplifier is connected to a second power source, and a negative input terminal of the operational amplifier is connected to the first terminal of the detection capacitor via a first switch; and an integrating capacitor, wherein two terminals of the integrating capacitor are connected via a sixth switch, and are connected between the negative input terminal of the operational amplifier and an output terminal of the operational amplifier.

11. The touch screen according to claim 10, wherein the first power source is a driving voltage source or a driving current source.

12. The touch screen according to claim 10, wherein the denoising capacitor is a capacitance-adjustable capacitor.

13. The touch screen according to claim 10, wherein a first resistor is connected between the second switch and the negative input terminal of the operation amplifier.

14. The touch screen according to claim 13, wherein the first resistor is connected between the first switch and the negative input terminal of the operation amplifier.

15. The capacitance variation detection circuit according to claim 14, wherein a second resistor is connected between the second power source and the positive input terminal of the operation amplifier.

16. The touch screen according to claim 10, wherein at a sampling stage of the capacitance variation detection circuit: the third switch, the fourth switch and the seventh switch are turned on; the first switch, the second switch, the fifth switch are turned off; and the sixth switch is turned on or turned off; and at an integrating stage of the capacitance variation detection circuit: the third switch, the fourth switch, the sixth switch and the seventh switch are turned off; and the first switch, the second switch, the fifth switch are turned on.

17. The touch screen according to claim 10, wherein the detection capacitor and the denoising capacitor are connected to the first power simultaneously at a first stage; and the detection capacitor is connected to the negative input terminal of the operation amplifier at a second stage, while the one terminal of the denosing capacitor is connected to the reference ground and the other terminal of the denosing capacitor is connected to the negative input terminal of the operation amplifier.

18. A touch detection method, applied to a touch screen, wherein the method comprises:

at a first stage, connecting one terminal of a detection capacitor and one terminal of a denoising capacitor to a first power simultaneously, and connecting the other terminal of the detection capacitor and the other terminal of a denoising capacitor to a reference ground simultaneously;

at a second stage, disconnecting the detection capacitor from the first power source, connecting the detection capacitor to the negative input terminal of the operation amplifier, switching the one terminal of the denoising capacitor from being connected to the first power source at the first stage to being connected to the reference ground, and connecting the other terminal of the denoising capacitor to the negative input terminal of the operational amplifier; and acquiring an output result of the operational amplifier, and judging whether there is a touch operation according to the output result.

19. The method according to claim 18, wherein the acquiring an output result of the operational amplifier comprises: repeatedly performing the first stage and the second stage according to a predetermined execution count to obtain the output result.

20. The method according to claim 19, wherein the predetermined execution count varies with different detection capacitors.

* * * * *